(12) United States Patent
    Piaton

(10) Patent No.: US 10,059,433 B2
(45) Date of Patent: Aug. 28, 2018

(54) ROTATION-BLOCKING DEVICE WITH SIMPLIFIED STRUCTURE, AND ACTUATOR COMPRISING SUCH A DEVICE

(71) Applicant: SAFRAN ELECTRONICS & DEFENSE, Boulogne Billancourt (FR)

(72) Inventor: Jerôme Piaton, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 15/113,167

(22) PCT Filed: Jan. 16, 2015

(86) PCT No.: PCT/EP2015/050814
§ 371 (c)(1),
(2) Date: Jul. 21, 2016

(87) PCT Pub. No.: WO2015/110365
PCT Pub. Date: Jul. 30, 2015

(65) Prior Publication Data
US 2017/0001714 A1    Jan. 5, 2017

(30) Foreign Application Priority Data
Jan. 27, 2014 (FR) ...................... 14 50639

(51) Int. Cl.
| F16D 41/066 | (2006.01) |
| F16D 27/02 | (2006.01) |
| B64C 13/28 | (2006.01) |
| F16D 41/08 | (2006.01) |
| F16D 27/00 | (2006.01) |

(Continued)

(52) U.S. Cl.
CPC .............. *B64C 13/28* (2013.01); *F16D 27/00* (2013.01); *F16D 27/02* (2013.01); *F16D 41/066* (2013.01); *F16D 41/088* (2013.01); *F16D 41/12* (2013.01); *F16H 31/001* (2013.01)

(58) Field of Classification Search
CPC ....... B64C 13/28; F16D 27/02; F16D 41/066; F16D 41/088; F16D 41/12
See application file for complete search history.

(56) References Cited

U.S. PATENT DOCUMENTS

| 2,735,029 A | 2/1956 | Dyer et al. |
| 2017/0248174 A1* | 8/2017 | Greene ................. F16D 41/12 |

FOREIGN PATENT DOCUMENTS

| CA | 2 529 629 A1 | 6/2007 |
| CN | 1 259 628 A | 7/2000 |

(Continued)

*Primary Examiner* — Huan G Le
(74) *Attorney, Agent, or Firm* — Muncy, Geissler, Olds & Lowe, P.C.

(57) ABSTRACT

A rotation-blocking device including a stator, a rotor, at least one blocking element mounted between the stator and the rotor to be movable between a position of interaction with the rotor and the stator and a position retracted relative to the rotor, and actuator means including a coil wound on the stator and connected to a control unit to power the coil so as to create a magnetic field, the blocking element being made of a material sensitive to the magnetic field in such a manner that powering the coil causes the blocking element to move towards one of its positions. A rotary actuator including such a device.

7 Claims, 1 Drawing Sheet

(51) Int. Cl.
*F16D 41/12* (2006.01)
*F16H 31/00* (2006.01)

(56) References Cited

FOREIGN PATENT DOCUMENTS

| | | |
|---|---|---|
| EP | 1 865 593 A2 | 12/2007 |
| FR | 2 549 598 A1 | 1/1985 |
| WO | WO 03/104673 A1 | 12/2003 |
| WO | WO 2012/136378 A1 | 10/2012 |
| WO | WO-2016057640 A2 * 4/2016 ............. F16D 27/09 |

* cited by examiner

ROTATION-BLOCKING DEVICE WITH SIMPLIFIED STRUCTURE, AND ACTUATOR COMPRISING SUCH A DEVICE

The present invention relates to a rotation-blocking device for blocking rotation of a movable element, the device being suitable for use in particular in the field of aviation for blocking an aileron or a flap of an aircraft. The invention also relates to an actuator including such a device.

Such a rotation-blocking device generally comprises a stator, a rotor mounted to pivot about a pivot axis, at least one blocking element mounted between the stator and the rotor to be movable between a position of interaction with the rotor and the stator and a position retracted relative to the rotor, and actuator means for actuating the blocking element between these two positions.

The device may be arranged in such a manner that it prevents the rotor from rotating in either direction of rotation. Alternatively, the device may be arranged in such a manner as to prevent the rotor from rotating in a single direction of rotation while leaving it free to rotate in the opposite direction.

The best-known device of this type is an over-running clutch or "freewheel" in which the blocking element is a pawl or a roller that is urged towards the interaction position by a resilient return element. The rotor is then free to turn in one direction of rotation, while the blocking element opposes rotation of the rotor in the other direction of rotation.

There also exist controlled blocking devices having a controlled actuator enabling the blocking element to be put into its retracted position in order to allow the rotor to pivot in both directions of rotation.

The actuator is usually an electromagnetic actuator having a solenoid and a movable core that acts directly on the blocking element. This leads to relatively large bulk and makes it more difficult to install in the equipment in which it is to be fitted.

An object of the invention is to provide a blocking device that is compact and reliable.

To this end, the invention provides a rotation-blocking device comprising a stator, a rotor mounted to pivot about a pivot axis, at least one blocking element mounted between the stator and the rotor to be movable between a position of interaction with the rotor and the stator and a position retracted relative to the rotor, and actuator means for actuating the blocking element between these two positions. The actuator means comprise a coil wound on the stator and connected to a control unit for powering the coil so as to create a magnetic field, and the blocking element is made of a material sensitive to the magnetic field in such a manner that powering the coil causes the blocking element to move towards one of its positions.

As a result, actuation is performed by means of a coil incorporated in the stator. The space occupied is thus limited. In addition, the blocking element itself constitutes a movable core of the resulting actuator, thereby serving to reduce the complexity of the device.

Preferably, the actuator means comprise a resilient return element for returning the blocking element towards the other one of its positions.

Thus, when the coil is no longer powered, the resilient element automatically returns the blocking element into the other one of its positions. This is particularly advantageous when, for safety reasons, the blocking element must be in one or the other of its positions in the event of the power supply being interrupted.

Preferably, the coil is arranged to move the blocking element from the interaction position towards the retracted position, and the resilient return element is arranged to move the blocking element from the retracted position towards the interaction position.

The invention also provides a rotary actuator including such a blocking device.

Other characteristics and advantages of the invention appear on reading the following description of particular, non-limiting embodiments of the invention.

Reference is made to the accompanying drawing, in which.

The invention is described herein in application to an actuator for a movable flight control surface of an aircraft. By way of example, the flight control surface may be a flap, an elevon, an aileron, etc.

Such a rotary actuator comprises a stationary structure, an element that is movable in rotation, and a drive member for driving the movable element in rotation relative to the stationary structure.

The actuator also comprises a device for blocking rotation so that in the absence of power supply the flap can return to its neutral position but cannot be taken away therefrom.

With reference to the figures, the rotation-blocking device of the invention comprises a stator 1 connected to the stationary structure and a rotor 2 constrained to rotate with the movable element and mounted to pivot about a pivot axis 3. In this example, the rotor 2 is in the form of a ring mounted to pivot about the stator 1, the stator 1 and the rotor 2 being mutually coaxial.

Blocking elements are mounted between the stator 1 and the rotor 2 to move between a position of interaction with the rotor 2 and the stator 1, and a position that is retracted relative to the rotor 2. More precisely, in the interaction position, the blocking elements oppose rotation of the rotor 2 in the direction of rotation R1 while allowing the rotor 2 free to rotate in the direction of rotation R2.

Figure 1:
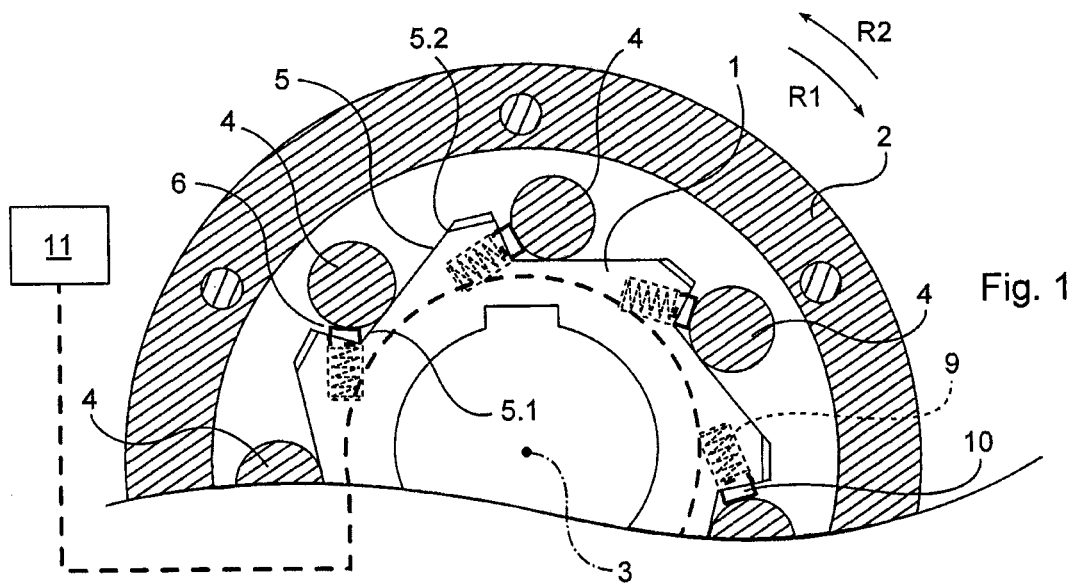
FIG. 1 is a diagrammatic cross-section view of a device in a first embodiment of the invention.
Figure 2:
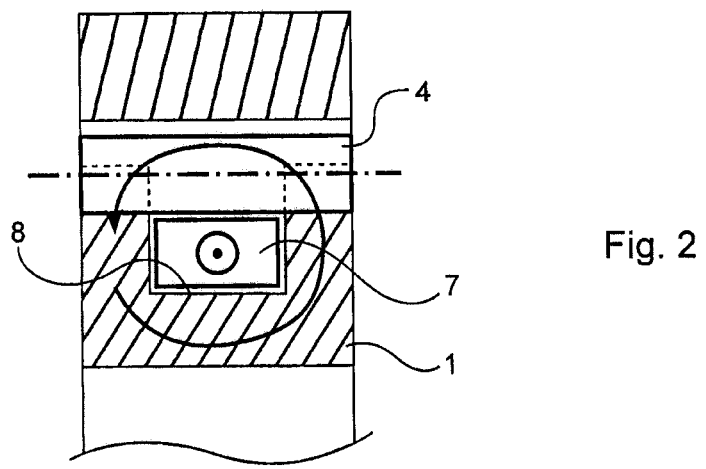
FIG. 2 is a fragmentary diagrammatic view of a device in section on line II-II of FIG. 1.

In the embodiment of FIGS. 1 and 2, the blocking elements are rollers 4 suitable for rolling over ramps 5 of the stator 1. Each ramp 5 is provided at a first end 5.1 with a housing 6 for receiving one of the rollers, and has a second end 5.2 extending at a distance from the pivot axis 3 that is greater than the distance between the first end 5.1 and the pivot axis 3. Thus, when the rollers 4 are in the housings 6, they define an outline of diameter that is smaller than the inside diameter of the rotor 2, whereas when the rollers 4 are in the vicinity of the ends 5.2, they define an outline of diameter substantially equal to the inside diameter of the rotor 2.

It can thus be understood that:
when the rollers 4 are in the housings 6, they leave the rotor 2 free to rotate in either direction of rotation; and
when the rollers 4 bear against the ramps 5 in the vicinity of the ends 5.2, the blocking elements oppose rotation of the rotor 2 in the direction of rotation R1 (in this direction of rotation, the rollers 4 tend to be taken towards the second end of the ramp 5 by friction against the rotor 2, and consequently they exert an increasing friction force against the rotor 2 until jamming occurs), while leaving the rotor 2 free to rotate in the direction of rotation R2 (in this direction of rotation, the rollers 4 tend to be taken towards the first end of the ramp 5).

The device also has actuator means for actuating the rollers 4 between these two positions.

The actuator means comprise a coil 7 wound in a groove 8 arranged circumferentially in the stator 1 and connected to a control unit, represented by 11, in order to power the coil 7 so as to create a magnetic field. The groove 8 and the coil 7 are thus centered on the pivot axis 3. The rollers 4 are made of material that is sensitive to the magnetic field created by the coil 7, when it is powered, such that powering the coil 7 causes the rollers 4 to move towards the retracted position.

The actuator means include resilient elements 9 for returning the rollers 4 towards the interaction position. A pusher 10 is interposed between each resilient element 9 and the associated roller 4.

Thus, in the absence of the coil 7 being powered, the rollers 4 are held in the interaction position and they prevent the rotor 2 from rotating in the direction R1, while leaving it free to rotate in the direction R2.

When the coil 7 is powered, the rollers 4 are held in the retracted position, thus allowing the rotor 2 to rotate both in the direction R2 and also in the direction R1. The coil 7 and the control unit 11 thus need to be dimensioned so that the coil 7 exerts a force greater than the force from the resilient element 9.

Naturally, the invention is not limited to embodiments described but covers any variant coming within the ambit to the invention as defined by the claims.

In particular, the number and the type of blocking elements may be different from those described.

Figure 3:
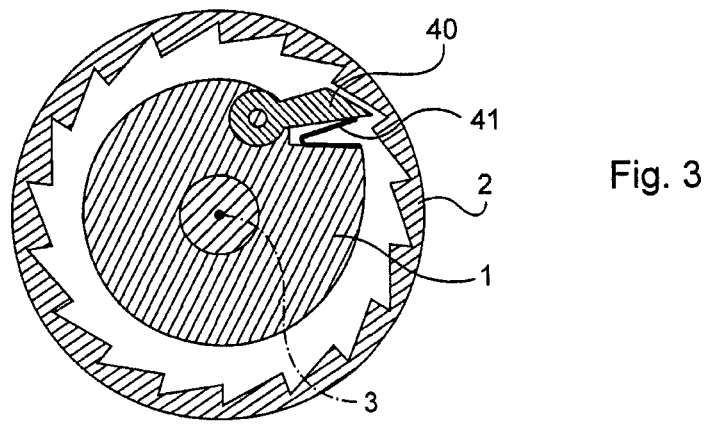
FIG. 3 is a diagrammatic cross-section view of a device in a second embodiment of the invention.

Thus, in the second embodiment of FIG. 3, the device has a single blocking element in the form of a pawl 40 that is pivotally mounted on the stator 1 to pivot between the retracted position and the interaction position, and the rotor 2 is arranged to form a ratchet wheel. As above, the pawl 40 is urged towards the interaction position by a resilient element 41 and it is taken into the retracted position when the coil 7 is powered.

Also in a variant, the rotor may be mounted to pivot inside the stator.

The resilient return element is optional and may be omitted or replaced by some other type of return element.

The invention claimed is:

1. A rotation-blocking device comprising a stator, a rotor mounted to pivot about a pivot axis, at least one blocking element mounted between the stator and the rotor to be movable between a position of interaction with the rotor and the stator and a position retracted relative to the rotor, and actuator means for actuating the blocking element between the interaction position and the retracted position, wherein the actuator means comprises a coil that is wound on the stator around an axis coaxial with the rotor and that is connected to a control unit for powering the coil in such a manner as to create a magnetic field, and in that the blocking element is made of material that is sensitive to the magnetic field in such a manner that powering the coil causes the blocking element to move towards one of its positions.

2. The device according to claim 1, wherein the actuator means comprise a resilient return element for returning the blocking element towards the interaction position when powering the coil causes the blocking element to move towards the retracted position.

3. The device according to claim 2, wherein the coil is arranged to move the blocking element from the interaction position to the retracted position, and the resilient return element is arranged to move the blocking element from the retracted position to the interaction position.

4. The device according to claim 1, wherein the blocking element is a roller bearing against a ramp of the stator.

5. The device according to claim 1, wherein the blocking element is a pawl pivotally mounted on the stator to pivot between the retracted position and the interaction position, and the rotor is arranged to form a ratchet wheel.

6. The device according to claim 1, wherein the rotor is mounted to pivot about the stator.

7. A rotary actuator including a stationary stator-forming structure, a rotor-forming element that is movable in rotation, and a rotation-blocking device according to claim 1.

* * * * *